(No Model.)
M. T. WADLIN.
MACHINE FOR OPENING AND CLEANING FIBROUS MATERIAL.
No. 494,500. Patented Mar. 28, 1893.
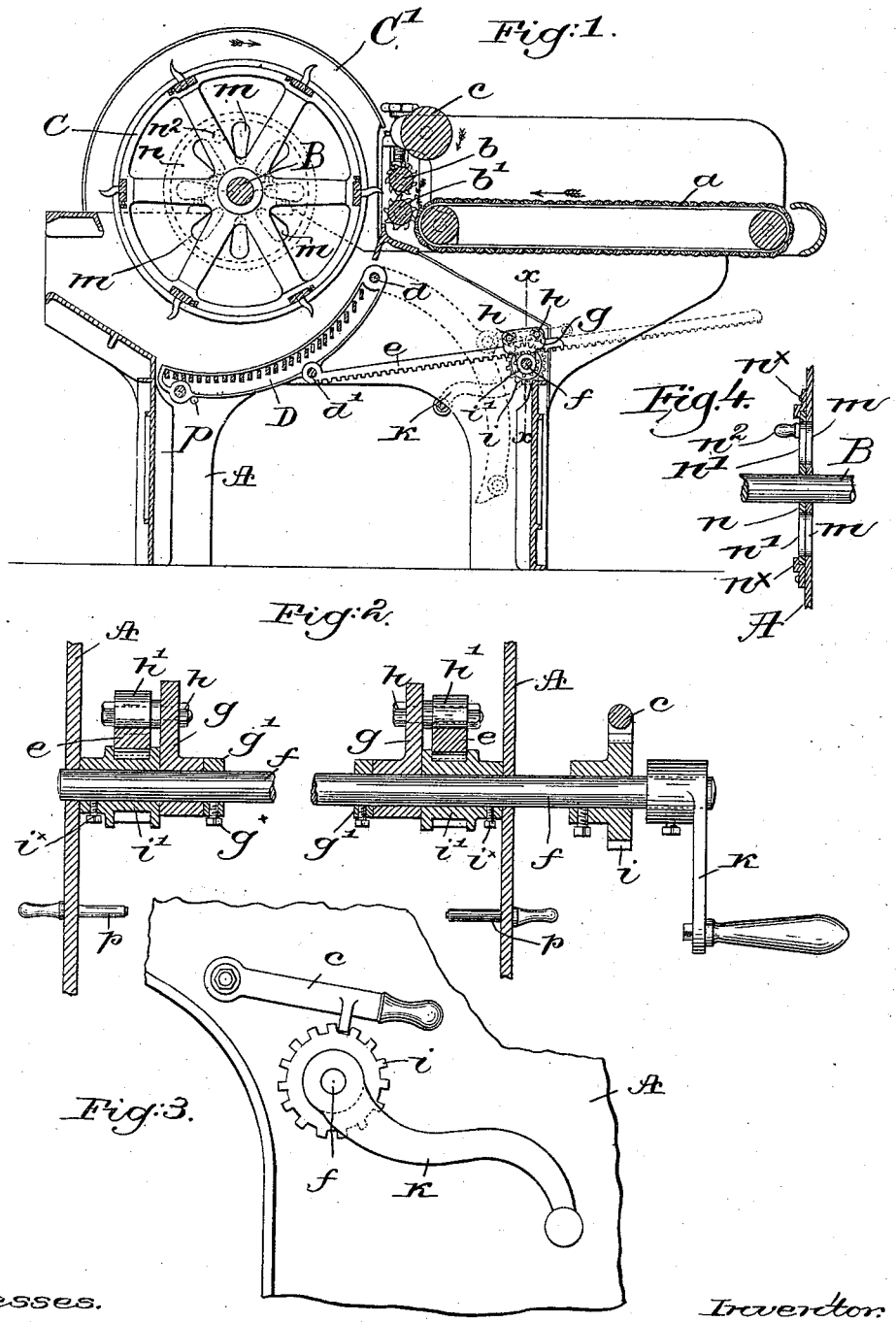
Witnesses.
Louis N. Gowell
Fred S. Greenleaf
Inventor.
Melville T. Wadlin
by Crosby Gregory
Attys.

UNITED STATES PATENT OFFICE.

MELVILLE T. WADLIN, OF NORTH ANDOVER, MASSACHUSETTS, ASSIGNOR TO THE DAVIS & FURBER MACHINE COMPANY, OF SAME PLACE.

MACHINE FOR OPENING AND CLEANING FIBROUS MATERIAL.

SPECIFICATION forming part of Letters Patent No. 494,500, dated March 28, 1893.

Application filed December 7, 1892. Serial No. 454,343. (No model.)

*To all whom it may concern:*

Be it known that I, MELVILLE T. WADLIN, of North Andover, county of Essex, State of Massachusetts, have invented an Improvement in Machines for Opening and Cleaning Fibrous Material, of which the following description, in connection with the accompanying drawings, is a specification, like letters on the drawings representing like parts.

This invention has for its object the production of an opener wherein the grid or rack is adapted to be moved entirely away from the main cylinder for the purpose of cleaning, and wherein the air entrances to the machine can be regulated.

My invention consists in the combination with the toothed main cylinder, and feeding devices, of a pivotally supported grid, a rotatable shaft, a gear fast thereon, a rack-bar pivotally connected to the grid and in mesh with said gear, and a pivotally supported guide for the rack-bar, substantially as will be described.

Other features of my invention will be hereinafter described and particularly pointed out in the claims.

Figure 1, represents in vertical section an opener with my invention applied thereto. Fig. 2, is a sectional detail, enlarged and broken out, taken on the line $x$—$x$, Fig. 1. Fig. 3, is a detail to be referred to; and Fig. 4, is a sectional detail to be referred to.

The side frames A, main shaft B supported therein, main toothed cylinder C, feed apron $a$, feed rolls $b$, $b'$, and rolls $c$ are of usual or well known construction, and they form no part of this invention.

The grid or rack D, see Fig. 1, is pivoted at its upper end, as at $d$, to the frame, and straight rack-bars $e$ are pivotally connected to each side of the grid $d'$, the tops of said rack-bars being plane.

A rotatable shaft $f$ is supported in the side frames near the front of the machine, and as best shown in Fig. 2, like gears $i'$ are secured thereto adjacent to the frames by suitable set screws $i^x$, the rack-bars resting on said gears and in mesh therewith, the tops of said rack-bars contacting with parallel rolls $h'$ on bolts or studs $h$ projecting from like guides $g$, said guides being herein shown as loosely supported on the shaft $f$ and held against longitudinal movement thereon by collars $g'$ and set screws $g^x$. As shown in Fig. 1, each guide is provided with two parallel rolls, and the rack-bars are free to move longitudinally between said rolls and the gears $i'$ when the latter are rotated, the shaft $f$ having a handle $k$ for that purpose. When it is desired to throw the grid down, the shaft $f$ is rotated, and the gears $i'$ in mesh with the rack-bars $e$ move the latter outwardly until the grid and bars are in the position shown by dotted lines Fig. 1, thus moving the grid entirely away from beneath the cylinder C, the rack-bars sliding under the feed-apron and out of the way.

In the constructions known to me for moving the grid the latter is moved only partially away from the cylinder, or the actuating mechanism, usually a toothed segment, will project beyond the machine or come in contact with the feed-apron, and to overcome these objections I have invented the herein described mechanism.

In this invention the outer ends of the rack-bars will move in a curve from one to the other extreme position, but will not contact with the feed-apron, and the changes in inclination of the said bars are permitted by the pivotal support of the guides $g$, which turn on the shaft $f$ so that the rolls $h'$ are at all times in contact with the tops of the rack-bars.

To hold the grid in any position, a detent $c$ is pivoted to the frame to co-operate with a notched wheel $i$ on the shaft $f$, see Figs. 2 and 3, and thereby lock the shaft from rotation.

If it is desired to independently lock the grid in full line position, Fig. 1, removable pins $p$ may be inserted in the side frames, the inner ends thereof forming rests for the free ends of the grid.

It is often desirable to admit a greater or less amount of air to the interior of the machine, according to the character of the stock being treated, in order that the mixed and open stock as it leaves the machine may be impelled with greater or less force.

I have herein shown one very convenient way of regulating the draft, the side frames at the ends of the hood C' being herein shown as provided with a series of openings $m$, arranged around the bearings of the shaft B, and a damper or regulator $n$, herein shown as a circular plate having openings $n'$, see Fig. 4, is retained in place by flanges $n^\times$ secured to the side frames. The openings $n'$ may be made to register with the openings $m$ by turning the plate $n$, to admit the greatest amount of air, and the amount can be reduced by partially rotating the plate until the openings $m$ are partially or entirely closed. The plate may be conveniently turned by a suitable handle $n^2$.

I claim—

1. The combination with the toothed main cylinder, and feeding devices, of a pivotally supported grid, a rotatable shaft, a gear fast thereon, a rack-bar pivotally connected to the grid and in mesh with said gear, and a pivotally supported guide for the rack-bar, substantially as described.

2. In an opening and cleaning machine, a main cylinder, and a hinged grid therefor, combined with a rotatable shaft, a gear fast thereon, a rack-bar in mesh therewith and pivotally connected to said grid, a guide free to rotate on said shaft, and parallel rolls carried by the guide, to contact with the top of the rack-bar and maintain it in mesh with the gear, substantially as described.

3. In an opening and cleaning machine, a main cylinder and a hinged grid therefor, combined with a rotatable shaft, a gear fast thereon, a rack-bar in mesh therewith and pivotally connected to said grid, a guide free to rotate on said shaft, parallel rolls carried by the guide, to contact with the top of the rack-bar and maintain it in mesh with the gear, and a locking device to restrain the shaft from rotation, substantially as described.

4. The toothed main cylinder, and feed rolls, combined with a grid hinged at one end, a rotatable shaft, gears fast thereon, rack-bars pivotally connected to the sides of the grid and in mesh with the gears, guides loose on said shaft, and rolls carried by said guides to contact with the tops of the rack-bars, substantially as described.

In testimony whereof I have signed my name to this specification in the presence of two subscribing witnesses.

MELVILLE T. WADLIN.

Witnesses:
JOHN B. LEWIS,
F. W. EATON.